US009374687B2

(12) United States Patent
Chen et al.

(10) Patent No.: US 9,374,687 B2
(45) Date of Patent: Jun. 21, 2016

(54) METHOD AND SYSTEM FOR NOTIFICATION BETWEEN MOBILE TERMINALS DURING COMMUNICATION

(71) Applicant: Tencent Technology (Shenzhen) Company Limited, Shenzhen (CN)

(72) Inventors: Haiyu Chen, Shenzhen (CN); Shumin Liao, Shenzhen (CN); Yuhan Huang, Shenzhen (CN); Zelin Cai, Shenzhen (CN); Junbo Luo, Shenzhen (CN); Shaobo Fan, Shenzhen (CN); Jinsong Zhong, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 117 days.

(21) Appl. No.: 14/257,940

(22) Filed: Apr. 21, 2014

(65) Prior Publication Data
US 2014/0228009 A1   Aug. 14, 2014

Related U.S. Application Data

(63) Continuation of application No. PCT/CN2013/087378, filed on Nov. 19, 2013.

(30) Foreign Application Priority Data

Dec. 26, 2012 (CN) .......................... 2012 1 0574198

(51) Int. Cl.
*H04M 3/42* (2006.01)
*H04M 1/725* (2006.01)
(Continued)

(52) U.S. Cl.
CPC ............. *H04W 4/12* (2013.01); *H04L 12/1818* (2013.01); *H04W 4/027* (2013.01); *H04M 1/72569* (2013.01)

(58) Field of Classification Search
CPC ..... H04W 4/12; H04W 4/14; H04L 29/08108
USPC .......................... 455/412.1–412.2, 414.1, 466
See application file for complete search history.

(56) References Cited

U.S. PATENT DOCUMENTS

2004/0176100 A1* 9/2004 Florkey ............... H04W 76/002
455/456.1
2008/0188207 A1* 8/2008 Lee ........................ H04W 8/18
455/414.1
(Continued)

FOREIGN PATENT DOCUMENTS

CN          1859500 A    11/2006
CN        101232491 A     7/2008
(Continued)

OTHER PUBLICATIONS

Tencent Technology, ISRWO, PCT/CN2013/087378, Mar. 6, 2014, 8 pgs.

(Continued)

*Primary Examiner* — Christopher M Brandt
*Assistant Examiner* — Matthew Genack
(74) *Attorney, Agent, or Firm* — Morgan, Lewis & Bockius LLP

(57) ABSTRACT

The present application discloses methods, devices, servers, and systems for notification between mobile terminals during communication. When two mobile terminals are in an active communication session, sometimes one terminal fails to respond to the other terminal due to various reasons such as distractions, additional responsibilities, or technical difficulties. The mobile terminal that is not getting a response may then utilize the process herein disclosed to notify the other terminal that a response is expected. By shaking or other convenient approaches, a mobile terminal may send out a notification request during an active communication session. The other terminal may return a notification response indicating whether the other terminal is in a current communication with a third mobile terminal or is in an idle status.

20 Claims, 7 Drawing Sheets

(51) Int. Cl.
*H04W 4/00* (2009.01)
*H04W 4/12* (2009.01)
*H04W 4/02* (2009.01)
*H04L 12/18* (2006.01)

(56) References Cited

U.S. PATENT DOCUMENTS

2012/0236834 A1* 9/2012 Ho .................... H04W 52/0216
370/337
2013/0316687 A1* 11/2013 Subbaramoo ......... H04M 1/605
455/418

FOREIGN PATENT DOCUMENTS

| CN | 101488992 | A | 7/2009 |
| CN | 101635689 | A | 1/2010 |
| CN | 102694923 | A | 9/2012 |
| CN | 103067490 | A | 4/2013 |

OTHER PUBLICATIONS

Tencent Technology, IPRP, PCT/CN2013/087378, Jun. 30, 2015, 6 pgs.

* cited by examiner

METHOD AND SYSTEM FOR NOTIFICATION BETWEEN MOBILE TERMINALS DURING COMMUNICATION

RELATED APPLICATIONS

This application is a continuation application of PCT Patent Application No. PCT/CN2013/087378, entitled "METHOD AND SYSTEM FOR NOTIFICATION BETWEEN MOBILE TERMINALS DURING COMMUNICATION" filed Nov. 19, 2013, which claims priority to Chinese Patent Application No. 201210574198.5, "Methods, Devices, Servers, and Systems for Notification between Mobile Terminals during Communication," filed Dec. 26, 2012, both of which are hereby incorporated by reference in their entirety.

FIELD OF THE INVENTION

The present application relates to the field of communication technology, and in particular to methods, devices, servers, and systems for notification between mobile terminals during communication.

BACKGROUND OF THE INVENTION

With the rapid development of communication technology, people are increasingly accustomed to using mobile terminals to communicate with friends and family for all types of exchanges, including voice conversations, video conferences, text messages, etc. With the existing technology, the users in an active communication session sometimes have to wait for the other end to reply, having no convenient way to remind the other end, resulting in long waits and waste of time.

Accordingly, it is necessary and desirable to provide a new technology, so as to resolve the technical problem and improve the above-mentioned approach.

SUMMARY

The above deficiencies and other problems associated with notification during communication are reduced or eliminated by the invention disclosed below. In some embodiments, the invention is implemented in a computer system that has one or more processors, memory and one or more modules, programs or sets of instructions stored in the memory for performing multiple functions. Instructions for performing these functions may be included in a computer program product configured for execution by one or more processors.

One aspect of the invention involves a computer-implemented method performed by a first mobile terminal. The first mobile terminal may detect a movement status of the first mobile terminal while the first mobile terminal and a second mobile terminal are in an active communication session. The first mobile terminal may then send a notification request to the second mobile terminal through a server when the movement status of the first mobile terminal satisfies a predefined condition, wherein: the notification request contains a second terminal identifier corresponding to the second mobile terminal, and in response to the notification request, the second mobile terminal is configured to return a notification response to the first mobile terminal through the server. After receiving the notification response from the server, the first terminal may display the notification response at the first mobile terminal, wherein the notification response indicates whether the second mobile terminal is in a current communication with a third mobile terminal or is in an idle status.

Another aspect of the invention involves a computer system. The computer system may comprise a server, a first mobile terminal, and at least one second mobile terminal, the first mobile terminal having one or more processors, memory, and one or more programs modules stored in the memory and configured for execution by the one or more processors, the one or more program modules including: a detection module configured to detect a movement status of the first mobile terminal while the first mobile terminal and the second mobile terminal are in an active communication session; a notification request module configured to send a notification request to the second mobile terminal through the server when the movement status of the first mobile terminal satisfies a predefined condition, wherein: the notification request contains a second terminal identifier corresponding to the second mobile terminal, and in response to the notification request, the second mobile terminal is configured to return a notification response to the first mobile terminal through the server; a receiving module configured to receive the notification response from the server; and a display module configured to display the notification response at the first mobile terminal, wherein the notification response indicates whether the second mobile terminal is in a current communication with a third mobile terminal or is in an idle status.

Another aspect of the invention involves a non-transitory computer readable storage medium having stored therein instructions, which, when executed by a first mobile terminal, cause the first mobile terminal to: detect a movement status of the first mobile terminal while the first mobile terminal and a second mobile terminal are in an active communication session; send a notification request to the second mobile terminal through the server when the movement status of the first mobile terminal satisfies a predefined condition, wherein: the notification request contains a second terminal identifier corresponding to the second mobile terminal, and in response to the notification request, the second mobile terminal is configured to return a notification response to the first mobile terminal through the server; receive the notification response from the server; and display the notification response at the first mobile terminal, wherein the notification response indicates whether the second mobile terminal is in a current communication with a third mobile terminal or is in an idle status.

Some embodiments may be implemented on either the terminal side or the server side of a terminal-server network environment.

BRIEF DESCRIPTION OF THE DRAWINGS

The aforementioned features and advantages of the invention as well as additional features and advantages thereof will be more clearly understood hereinafter as a result of a detailed description of preferred embodiments when taken in conjunction with the drawings.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

Figure 7:
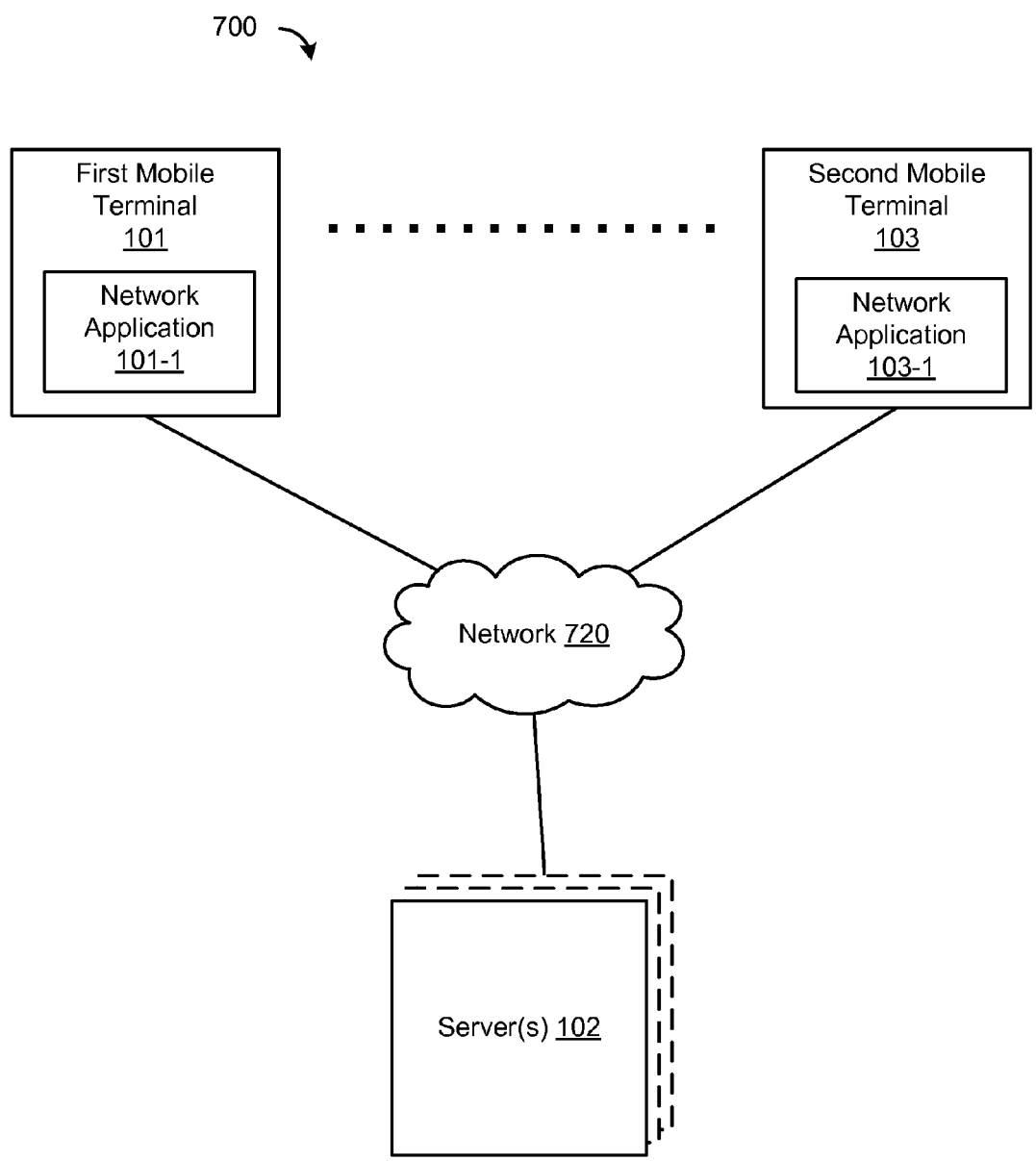
FIG. 7 is a block diagram of a network environment in accordance with some embodiments of the present application.

FIG. 7 is a block diagram of a network environment in accordance with some embodiments of the present application. The network environment 700 includes one or more servers 102, one first mobile terminal 101, and one second mobile terminal 103. The first mobile terminal 101 and the second mobile terminal 103 are connected to the server 102 via a network 720 (e.g., the Internet). Through the network 720, the first mobile terminal 101 and the second mobile terminal 103 in the network environment 700 may exchange information with one another using network applications 101-1 and 103-1. The server 102 interacts with the first mobile terminal 101 and the second mobile terminal 102, maintains communication channels, processes and relays notifications and responses between the first mobile terminal 101 and the second mobile terminal 102. It should be noted that FIG. 7 only shows an example, wherein the number of devices and the manner of connection may vary. For example, there may be one or more servers, one or more first mobile terminals, and one or more second mobile terminals, wherein the first mobile terminals are the terminals sending out notification request and the second mobile terminals are the terminals receiving such requests.

Figure 1:
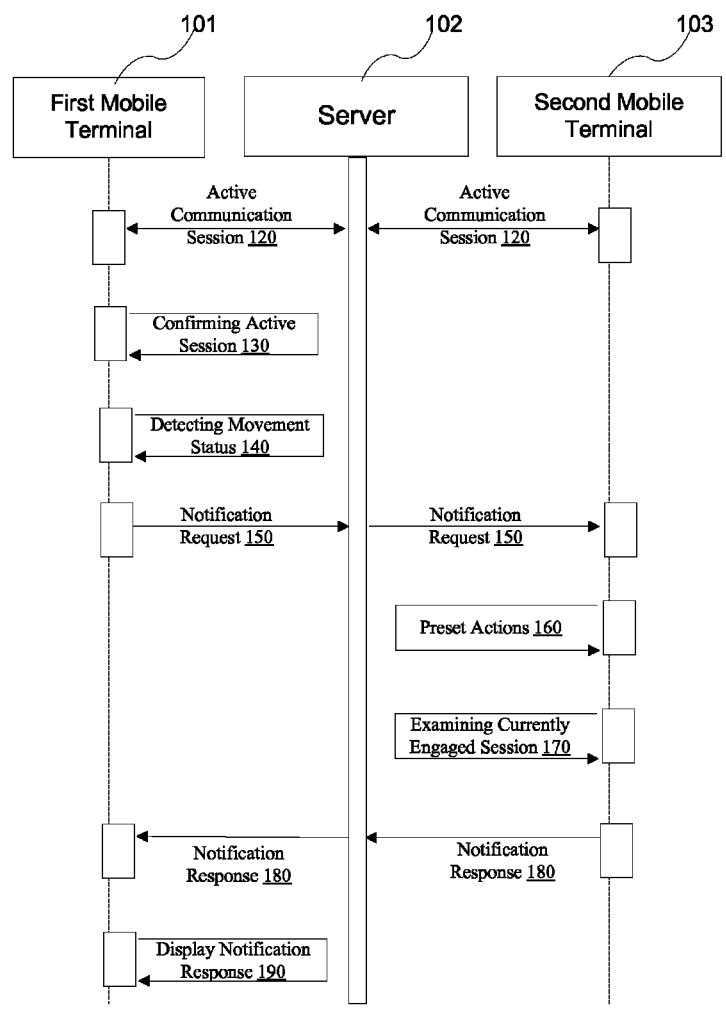
FIG. 1 is a schematic illustration of how a server, a first mobile terminal, and a second mobile terminal interact in a notification process in accordance with some embodiments of the present application.

FIG. 1 is a schematic illustration of how a server 102, a first mobile terminal 101, and a second mobile terminal 103 interact in a notification process in accordance with some embodiments of the present application.

Figure 2:
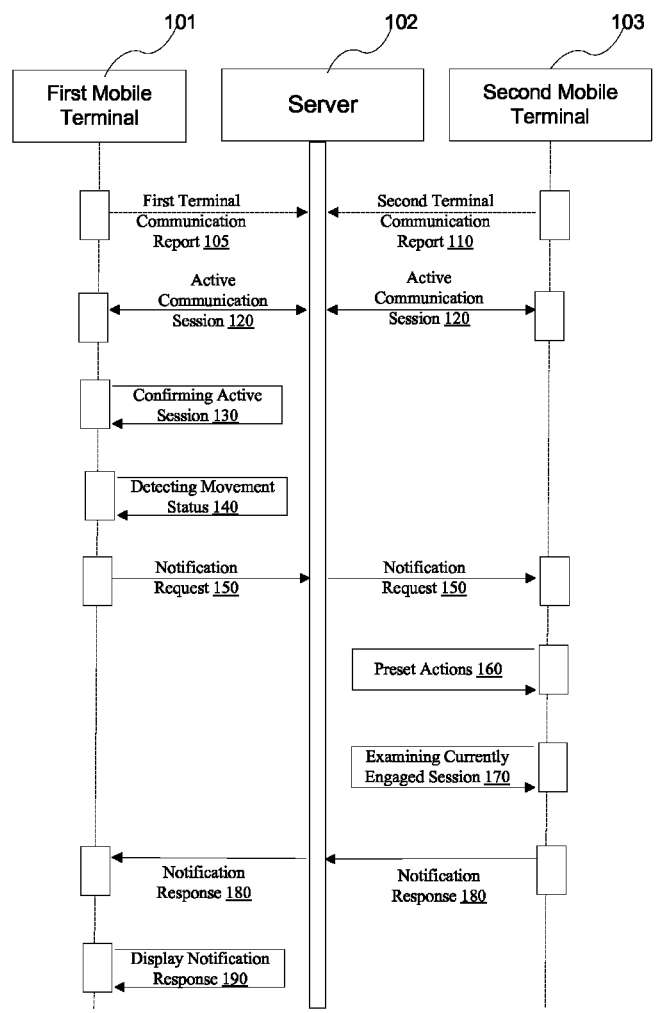
FIG. 2 is a schematic illustration of how a server, a first mobile terminal, and a second mobile terminal interact in the notification process in accordance with some embodiments of the present application, providing more details.

FIG. 2 is a schematic illustration of how a server 102, a first mobile terminal 101, and a second mobile terminal 103 interact in the notification process in accordance with some embodiments of the present application, providing more details.

Figure 3:
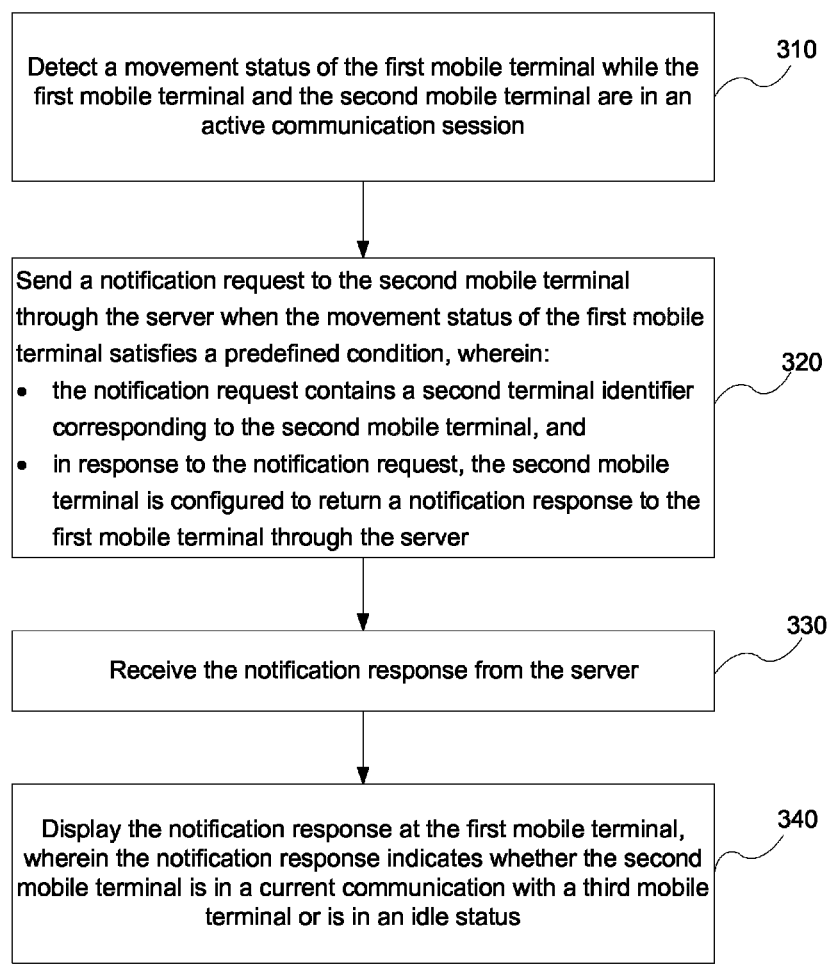
FIG. 3 is a flowchart illustrative of a method for a notification process between a first mobile terminal and a second mobile terminal in accordance with some embodiments of the present application.

FIG. 3 is a flowchart illustrative of a method for a notification process between a first mobile terminal and a second mobile terminal in accordance with some embodiments of the present application.

Referring to FIG. 1 and FIG. 2, the first mobile terminal 101 and the second mobile terminal 103 may be in an active communication session 120. The active communication session may refer to any real-time chat or messaging sessions based on text, audio, or video exchanges, or any combination thereof. The active communication session may refer to a session where no further authorization is required to set up a communication channel. A communication channel between the first mobile terminal 101 and the second mobile terminal 103 has been established and messages from one mobile terminal may reach the other mobile terminal directly without the other mobile terminal's further authorization. In operation, an active communication session may be reflected by the presence of a communication interface, such as a chat window, wherein the communication interface may be used to exchange text, audio, and/or video messages.

However, an active communication session does not ensure that both parties are actively engaged in the exchange at the present moment. One party in the active communication session may be idle—the active communication session is still the currently engaged session but the party is not paying attention, or may be engaging in task/communication not involving the other party of the active communication session—e.g. in a current communication with a third party. In operation, an active communication session may be a currently engaged session when the communication interface used for the active communication session is the highlighted or selected interface. On the other hand, an active communication session may be in the background—not a currently engaged session and not being highlighted or selected.

The first mobile terminal 101 and the second mobile terminal 103 may be any computing device that has networking capability and is able to receive, transfer, play and/or display digital contents such as but not limited to text, pictures, audio, video, and any combination thereof. The first mobile terminal 101 and second mobile terminal 103 may or may not be the same type of devices. The first mobile terminal 101 and/or the second mobile terminal 103 may be a smart phone, a tablet computer, a personal digital assistant (PDA), an e-book reader, a vehicle-associated terminal, a digital photo frame, a laptop computer, or a desktop computer. The server 102 may be any computing device that that is capable of providing data processing and networking capabilities. The active communication session 120 may be maintained by the server 102. It should also be noted that the embodiments shown in FIGS. 1-2 are considered examples of the interactions between the devices. The number of devices involved in the current system may vary according to the needs of the users, the capacity of the server and the application programs, and the hardware capabilities of the first mobile terminals and the second mobile terminals. There may be multiple first mobile terminals and/or multiple interacting mobile terminals, forming a number of active communication sessions. In some embodiments, a number of mobile terminals are in an active communication session. The first mobile terminal is the terminal sending out the notification request; and the second mobile terminal generally refers to mobile terminals receiving the notification request.

Referring to FIGS. 1 and 2, as shown in step 130, the first mobile terminal 101 may confirm that the first mobile terminal 101 is in an active communication session. Step 130 may involve self-examination of one-going processes by the first mobile terminal 101. In some embodiments, being in an active communication session provides a prerequisite for the first mobile terminal 101 to send out a notification request—if the confirmation cannot be completed, the first mobile terminal 101 may not send out the request. Alternatively, step 130 may be optional and the notification request may be sent without final confirmation that the first mobile terminal 101 and the second mobile terminal 103 are in an active communication session.

Referring to FIGS. 1 and 2, as shown in step 140, the first mobile terminal 101 may detect the movement status of the first mobile terminal 101. Also referring to FIG. 3, as shown in step 310, the first mobile terminal may detect a movement status of the first mobile terminal while the first mobile terminal and the second mobile terminal are in an active communication session.

The movement status may refer to a processed combination of a number of parameters of first mobile terminal 101. Such parameters may include but not limited to: orientation, position, location, direction, speed, and acceleration. Sensors built in the first mobile terminal 101 or attached to the first mobile terminal 101 may detect the parameters and application programming interfaces (APIs) may be used to determine the movement status of the first mobile terminal 101 based on compilations and calculations. For example, accelerometers and other sensors associated with the first mobile terminal 101 may be used to detect that the first mobile terminal 101 is being shaken—the device is being moved in predefined pattern (e.g. back-and-forth) with speeds/accelerations that fit in a predefined range. The operational approaches to determine the movement status are known in the art and may vary based on the setup of device and preference of the users.

Referring to FIG. 3, as shown in step 320, the first mobile terminal may send a notification request to the second mobile terminal through the server when the movement status of the first mobile terminal satisfies a predefined condition, wherein: the notification request contains a second terminal identifier corresponding to the second mobile terminal, and in response to the notification request, the second mobile terminal is configured to return a notification response to the first mobile terminal through the server.

Referring to FIGS. 1 and 2, the first mobile terminal 101 may send a notification request 150 to the second mobile terminal 103 through the server 102. In some embodiments, as indicated above, the notification request 150 is sent only when the movement status of the first mobile terminal 101 satisfies a predefined condition.

In some embodiments, the notification request 150 may contain a second terminal identifier. The second terminal identifier may correspond to the second mobile terminal 103 and may be used to identify the second mobile terminal 103. Similarly, the first mobile terminal 101 may have a first terminal identifier that may be used to identify the first mobile terminal 101. The terminal identifiers may be any device, chip, symbol, code, data, or electronic or magnetic information item. A terminal identifier may have a one-to-one corresponding relationship with the mobile terminal and the mobile terminal may be uniquely identified by the terminal identifier. In some embodiments, the first terminal identifier may be a chip/device identification code, a cell phone number, a communication account number, or a server login account number that may be embedded in a notification request. In some embodiments, the terminal identifier may be a radio-frequency identification (RFID) tag based on other wireless networking technologies. In some other embodiments, the first terminal identifier may be a barcode (e.g. 2-dimension barcode) attached to the external surface of the mobile terminal.

The terminal identifiers (e.g. the second terminal identifier) may be acquired by the server or other devices by simple transmission. For example, in some embodiments, the second terminal identifier may be embedded in the notification request and the server may extract the second terminal identifier from the notification request and identify the second mobile terminal based on the second terminal identifier, ensuring correct transmission of the notification request. In addition, the first terminal identifier may also be transmitted in the notification request, allowing the server and the second mobile terminal to identify the mobile terminal that sends out the notification request.

In some embodiments, the terminal identifiers may be acquired before the notification request is sent. For example, a barcode or a RFID tag terminal identifier may be scanned or detected by another device with scanning or radio-frequency detection before the notification request is transmitted.

The server 102, as indicated above, may be any computing device. The server 102 may comprise network applications that may be used to connect to the first mobile terminal 101 and the second mobile terminal 103. In some embodiments, the server 102 may play a role in filtering the notification request 150. For example, instead of indiscriminately forwarding all the notification request from the first mobile terminal 101, the server 102 may further examine whether the first mobile terminal 101 and the second mobile terminal 103 are in an active communication session and only send the notification request 150 to the second mobile terminal 103 when the result is positive. Furthermore, the server 102 may examine whether the active communication session is the currently engaged session for second mobile terminal 103 and only send the notification request 150 to the second mobile terminal 103 when the result is positive. The communication status of the first mobile terminal 101 and second mobile terminal 103 may be acquired by the server through communication reports 105 and 110, as described below. The filtering approach may limit which notification request 150 may reach the second mobile terminal 103, preventing disturbance and/or harassment in certain scenarios.

The notification request 150 is a request from the first mobile terminal 101 to get the attention of the user of the second mobile terminal 103. In some embodiments, the user of the second mobile terminal 103 may become distracted or get hindered by technical difficulties such as a slow network connection, resulting in lack of communication from the second mobile terminal 103. The user of the first mobile terminal 101 may want to remind the second mobile terminal 103 that an exchange is taking place and the user of the first mobile terminal 101 is waiting for a response. Thus, the notification request 150 may include a reminder section, which indicates that the first mobile terminal 101 is waiting for a response from the second mobile terminal.

As indicated in step 320 of FIG. 3, in some embodiments, the notification request may be sent when the movement status satisfies a predetermined condition. As indicated above, the operational approaches to determine the movement status are generally known. The conditions for the movement status may be set by establishing a combination of patterns and ranges for the parameters that are associated with the movement status. For example, the preset condition may be formulated as: the first mobile terminal is being shaken;

and shaking may be further defined by setting certain patterns and ranges for the moving directions, average speed, average distance, and/or average acceleration of the first mobile terminal. By setting proper patterns and ranges, shaking can be effectively distinguished from other movement status such as vibrating. The preset condition for the movement status may be set to any combination or repetition of movements. For example, the preset condition may be that the first mobile terminal is being swirled around. By providing clear definitions for the parameters, the first mobile terminal may determine whether the preset condition is satisfied. In some embodiments, the user may be able to set the predefined conditions.

The notification request may be sent under a number of conditions. One example of such conditions is listed above— the movement status of the first mobile terminal is that the first mobile terminal is being shaken. Another example of the condition may be that a time period since the first mobile terminal has received the last message from the second mobile terminal exceeds a threshold (e.g. 2 minutes). With such a limitation, the notification request may only be sent if the first mobile terminal has not received a response from the second mobile terminal for an extended period of time—the time period exceeding a threshold. Such optional conditions may prevent unintentional transmission of notification requests.

Referring to FIGS. 1 and 2, after receiving the notification request, the second mobile terminal 103 may be induced to engage in preset actions 160. The preset actions 160 may be any actions that provide notice to the user of the second mobile terminal 103. The preset actions 160 may be actions configured by a program in the second mobile terminal 103 or by the user of the second mobile terminal 103. The preset actions 160 may be: vibrating, flashing, displaying a message, receiving an email, displaying a pop-up window, displaying a picture or photo, playing a sound track, showing a video, or any combination thereof. For example, the preset actions 160 may be displaying the reminder section of the notification request 150. The preset actions 160 may take place instantaneous after the second mobile terminal 103 receives the notification request 150 or may be delayed by a fixed time period. The preset actions 160 are optional and it is possible that the second mobile terminal 103 does not engage in any actions after receiving the notification request 150.

Referring to FIGS. 1 and 2, in step 170, the second mobile terminal 103 may examine the currently engaged session of the second mobile terminal 103. As indicated above, the currently engaged session is generally a communication session that the second mobile terminal 103 instantly participants in and is usually the highlighted or selected session. The currently engaged session may be the active communication session 120. However, the currently engaged session may also be another communication session that is different from the active communication session 120 and/or does not involve first mobile terminal 101.

As indicated in step 320 of FIG. 3, and also referring to FIGS. 1 and 2, the second mobile terminal 103 may send a notification response 180 to the first mobile terminal 101 through the sever 102. The notification response 180 may inform the first mobile terminal 101 about the currently engage session of the second mobile terminal 103. Referring to FIGS. 1 and 2, also shown by step 330 of FIG. 3, the first mobile terminal 101 may receive the notification response 180 from the second mobile terminal 103.

The notification response 180 is an optional response from the second mobile terminal 103 to the first mobile terminal 101. The notification response 180 may be sent automatically after the second mobile terminal 103 receives the notification request 150. On the other hand, the notification response 180 may be sent only when certain conditions are satisfied. For example, the second mobile terminal 103 may send out the notification response 180 if the second mobile terminal 103 is in a current communication with a third mobile terminal. When the active communication session 120 is not the currently engaged session for the second mobile terminal 103, the second mobile terminal 103 may be communicating with a third mobile terminal, making it necessary to notify the first mobile terminal 101 not to wait any more. On the other hand, it may not be necessary to send the notification response 180 when the second mobile terminal 103 is only idle—the active communication session is still the highlighted and/or selected session, only that the user of the second mobile terminal 103 is distracted or hindered by technical difficulties. In such situations, the user the second mobile terminal 103 may simply send a response through user input. Nevertheless, it is possible that the notification response 180 may be sent simply in response to the notification request 150, without any further conditions.

The notification response 180 may be based on the first terminal identifier, which uniquely identifies the first mobile terminal 101. The first terminal identifier, as described above, may be acquired by the second mobile terminal 103 by various processes such as transmission from the first mobile terminal 101 or by searching the server 102.

Referring to FIGS. 1 and 2, also shown by step 190, the first mobile terminal 101 may display the notification response 180 at the first mobile terminal 101. Also referring to FIG. 3, in some embodiments, the notification response may indicate whether the second mobile terminal is in a current communication with a third mobile terminal or is in an idle status.

As indicated above, after receiving the notification request 150, the second mobile terminal 103 may examine its currently engaged session in step 170. Then the second mobile terminal 103 may export the examination results in the notification response 180 to inform the first mobile terminal 101. The notification response 180 may contain all kinds of information, such as but not limited to the currently engaged session of the second mobile terminal 103. In some embodiments, the second mobile terminal 103 may be in a current communication with a third mobile terminal or in an idle status with the active communication session as the currently engaged session. The notification response 180 may provide such information to the first mobile terminal 101 so that the user of the first mobile terminal 101 may understand whether it is likely that the user of the second mobile terminal 103 may respond through user input. The notification response 180 may also include other information such as but not limited to: that the user of the second mobile terminal 103 will respond soon through user input; that the second mobile terminal 103 is experiencing technical difficulties; and that the second mobile terminal 103 is no longer in an active communication session with the first mobile terminal 101.

Referring to FIG. 2, the first mobile terminal 101 may, optionally, send first terminal communication reports 105 to the server 102. Similarly, the second mobile terminal 103 may send second terminal communication reports 110 to the server 102. The first terminal communication reports 105 and the second terminal communication reports 110 may be sent with or without conditions. In some embodiments, the first terminal communication reports 105 and/or the second terminal communication reports 110 may be sent only when the first mobile terminal 101 and the second mobile terminal 103 are in an active communication session 120. On the other hand, the first terminal communication reports 105 and/or the second terminal communication reports 110 may be sent automatically without further conditions.

The first terminal communication report 105 may be sent before or after the notification request 150. In some embodiments, the first terminal communication reports 105 are associated with or even merge with the notification request 150. Alternatively, in some embodiments, the first terminal communication reports 105 may be send periodically and repeatedly, but not associated with the notification request 150. The first terminal communication report 105 may include a number of information items such as but not limited to: the movement status of the first mobile terminal 101, the first terminal identifier of the first mobile terminal 101, and the active communication sessions of the first mobile terminal 101. By receiving the first terminal communication report 105, the server 102 may be better informed about the operations of the first mobile terminal 101. Some of the functions stated above as performed by the first mobile terminal 101 may be performed by the server 102. For example, by receiving and analyzing the movement status of the first mobile terminal 101, the server 102 may be used as the device that send out the notification request 150. The first terminal identifier may be used to identify the first mobile terminal 101 when the server 102 is sending the notification response 180 to the first mobile terminal 101.

Similarly, the second terminal communication report 110 may be sent before or after the notification request 150. In some embodiments, the second terminal communication reports 110 are associated with the notification request 150. In some embodiments, the second terminal communication reports 110 may be associated or merged with the notification response 180. Alternatively, in some embodiments, the second terminal communication reports 110 may be send periodically and repeatedly, but not associated with the notification request 150 or notification response 180. The second terminal communication report 110 may include a number of information items such as but not limited to: the second terminal identifier of the second mobile terminal 103, the active communication sessions of the second mobile terminal 103, and the currently engaged session of the second mobile terminal 103. By receiving the second terminal communication report 110, the server 102 may be better informed about the operations of the second mobile terminal 103. For example, the second terminal identifier may assist the server 102 in sending the notification request 150 to the second mobile terminal 103.

FIGS. 4-6 and 8 illustrate the computer systems that may be used to perform the methods described above. To avoid redundancy, not all the details and variations described for the method are herein included for the devices. Such details and variations should be considered included for the description of the devices as long as they are not in direct contradiction to the specific description provided for the methods.

Figure 4:
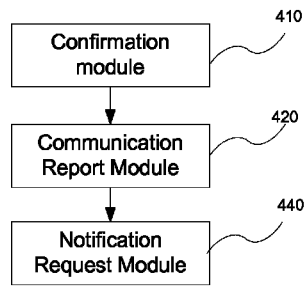
FIG. 4 is a block diagram illustrative of a first mobile terminal comprising modules configured to provide notification to a second terminal during an active communication session in accordance with some embodiments of the present application.

FIG. 4 is a block diagram illustrative of a first mobile terminal comprising modules configured to provide notification to a second terminal during an active communication session in accordance with some embodiments of the present application. The first mobile terminal may have one or more processors; memory; and one or more programs modules stored in the memory and configured for execution by the one or more processors, the one or more program modules including: a confirmation module 410 configured to confirm that the first mobile terminal is in an active communication session with a second mobile terminal; a communication report module 420 configured to periodically send a first terminal communication report to the server, wherein the first terminal communication report indicates whether the first terminal is in an active communication session with the second terminal; and a notification request module 440 configured to send a notification request to the second mobile terminal through the server when the movement status of the first mobile terminal satisfies a predefined condition.

Figure 5:
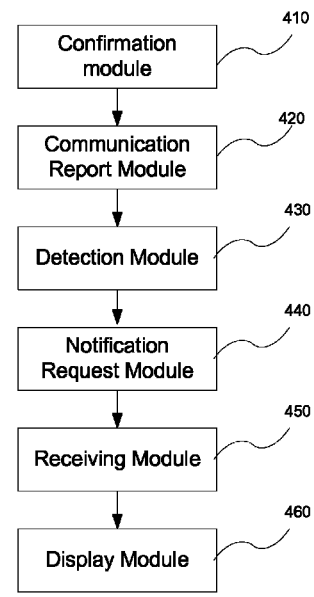
FIG. 5 is a block diagram illustrative of a first mobile terminal comprising modules configured to provide notification to a second terminal during an active communication session in accordance with some embodiments of the present application, providing more details for the modules.

FIG. 5 is a block diagram illustrative of a first mobile terminal comprising modules configured to provide notification to a second terminal during an active communication session in accordance with some embodiments of the present application, providing more details for the modules. The first mobile terminal may have one or more processors; memory; and one or more programs modules stored in the memory and configured for execution by the one or more processors, the one or more program modules including: a confirmation module 410 configured to confirm that the first mobile terminal is in an active communication session with a second mobile terminal; a communication report module 420 configured to periodically send a first terminal communication report to the server, wherein the first terminal communication report indicates whether the first terminal is in an active communication session with the second terminal; a detection module 430 configured to detect a movement status of the first mobile terminal while the first mobile terminal and the second mobile terminal are in an active communication session; a notification request module 440 configured to send a notification request to the second mobile terminal through the server when the movement status of the first mobile terminal satisfies a predefined condition, wherein the notification request contains a second terminal identifier corresponding to the second mobile terminal, and in response to the notification request, the second mobile terminal is configured to return a notification response to the first mobile terminal through the server; a receiving module 450 configured to receive the notification response from the server; and a display module 460 configured to display the notification response at the first mobile terminal, wherein the notification response indicates whether the second mobile terminal is in a current communication with a third mobile terminal or is in an idle status.

Figure 6:
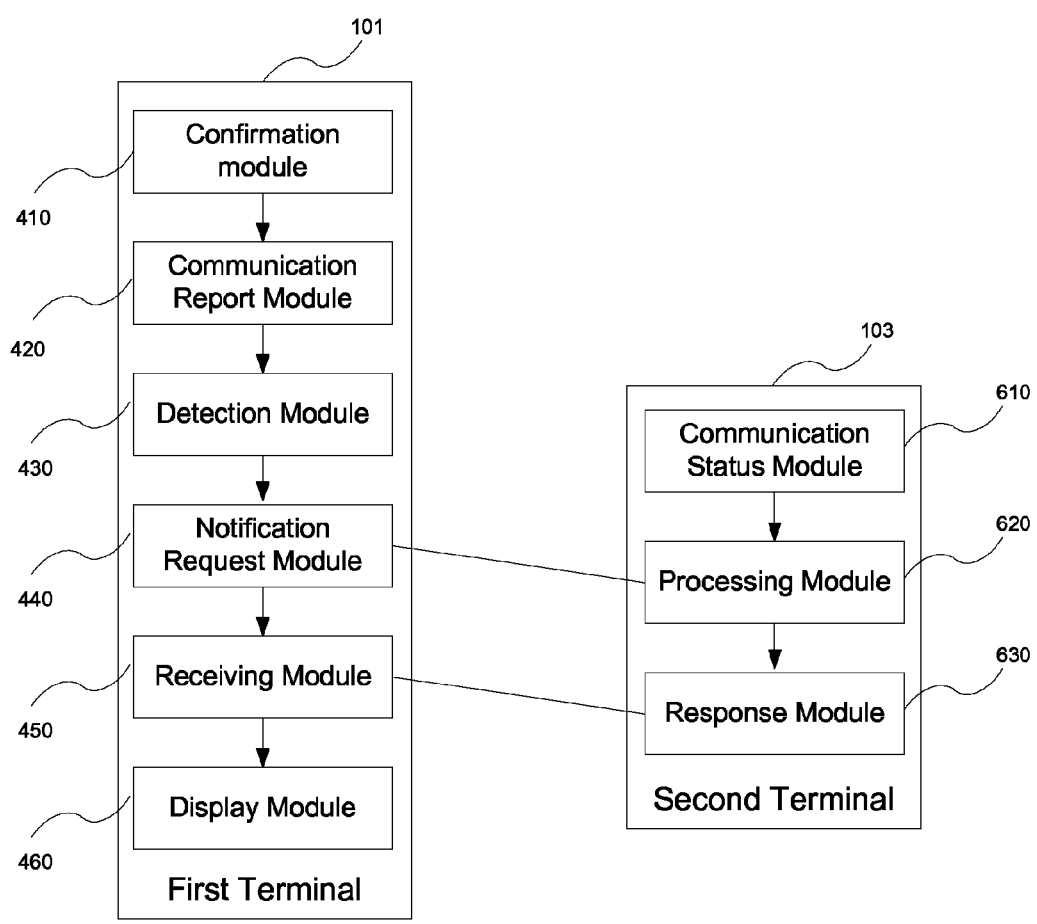
FIG. 6 is a block diagram illustrative of a first mobile terminal and a second mobile terminal, both comprising modules configured to provide notification from the first mobile terminal to the second terminal during an active communication session in accordance with some embodiments of the present application.

FIG. 6 is a block diagram illustrative of a first mobile terminal and a second mobile terminal, both comprising modules configured to provide notification from the first mobile terminal to the second terminal during an active communication session in accordance with some embodiments of the present application. The first mobile terminal may have one or more processors; memory; and one or more programs modules stored in the memory and configured for execution by the one or more processors, the one or more program modules including a confirmation module 410, a communication report module 420, a detection module 430, a notification request module 440, a receiving module 450, and a display module 460, as described in FIG. 5. The second mobile terminal may have one or more processors; memory; and one or more programs modules stored in the memory and configured for execution by the one or more processors, the one or more program modules including: a communication status module 610, configured to examine whether the first mobile terminal is in a current communication with the second mobile terminal; a processing module 620 configured to process the notification request and engage in preset actions upon receiving the notification request, wherein the preset actions causes the second mobile terminal to vibrate, flash, display a message, receive an email, display a pop-up window, display a picture or photo, play a sound track, show a video, or any combination thereof; and a response module 630 configured to return a notification response to the first mobile terminal through the server.

As indicated above, the second mobile terminal may periodically send a second terminal communication report to the server, and the second terminal communication report may indicate whether the second mobile terminal is in a current communication with the third mobile terminal or is in an idle status. In addition, the notification request may be based on the first terminal identifier and contain a first terminal identifier corresponding to the first terminal, and the notification request may indicate that the first mobile terminal is waiting for a response from the second mobile terminal.

Figure 8:
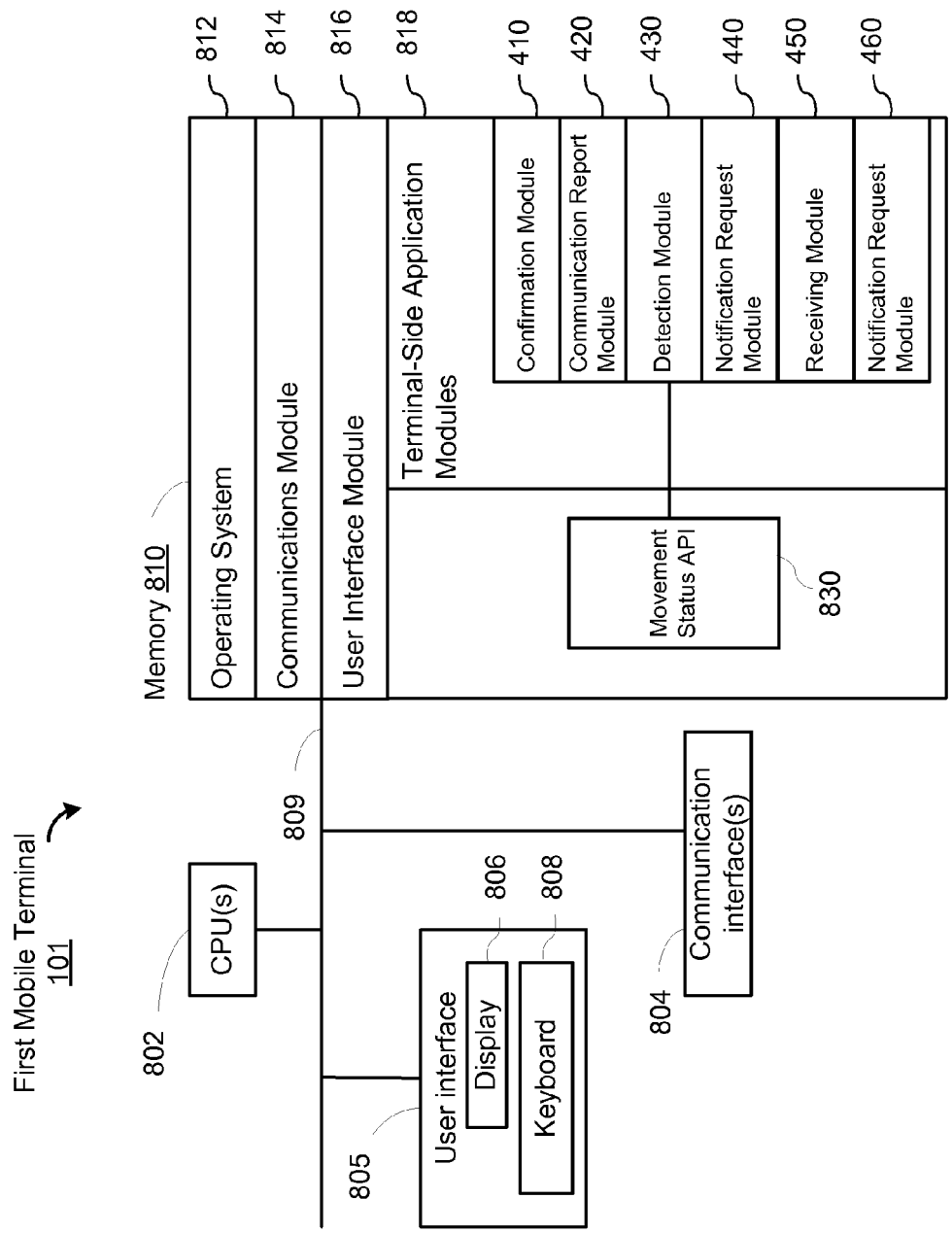
FIG. 8 is a block diagram of a first mobile terminal in accordance with some embodiments of the present application.

FIG. 8 is a block diagram of a first mobile terminal in accordance with some embodiments of the present application. The exemplary first mobile terminal 101 typically includes one or more processing units (CPU's) 802, one or more network or other communications interfaces 804, memory 810, and one or more communication buses 809 for interconnecting these components. The communication buses 809 may include circuitry (sometimes called a chipset) that interconnects and controls communications between system components. The first mobile terminal 101 may include a user interface 805, for instance, a display 806 and a keyboard 808. When the first mobile terminal 101 is a smart phone or tablet, the user interface 805 may be a touch screen, which is both a display and an input device. Memory 810 may include high speed random access memory and may also include non-volatile memory, such as one or more magnetic disk storage devices. Memory 810 may include mass storage that is remotely located from the CPU's 802. In some embodiments, memory 810 stores the following programs, modules and data structures, or a subset or superset thereof:

- an operating system 812 that includes procedures for handling various basic system services and for performing hardware dependent tasks;
- a network communication module 814 that is used for connecting the first mobile terminal 101 to the server, the mobile terminals, and/or other computers via one or more communication networks (wired or wireless), such as the Internet, other wide area networks, local area networks, metropolitan area networks, and so on;
- a user interface module 816 configured to receive user inputs through the user interface 805;
- and a number of terminal-side application modules 818 including the following:
- a confirmation module 410 configured to confirm that the first mobile terminal is in an active communication session with a second mobile terminal;
- a communication report module 420 configured to periodically send a first terminal communication report to the server, wherein the first terminal communication report indicates whether the first terminal is in an active communication session with the second terminal;
- a detection module 430 configured to use movement status API 830 to detect a movement status of the first mobile terminal while the first mobile terminal and the second mobile terminal are in an active communication session;
- a notification request module 440 configured to send a notification request to the second mobile terminal through the server when the movement status of the first mobile terminal satisfies a predefined condition, wherein the notification request contains a second terminal identifier corresponding to the second mobile terminal, and in response to the notification request, the second mobile terminal is configured to return a notification response to the first mobile terminal through the server;
- a receiving module 450 configured to receive the notification response from the server; and
- a display module 460 configured to display the notification response at the first mobile terminal, wherein the notification response indicates whether the second mobile terminal is in a current communication with a third mobile terminal or is in an idle status.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for notification between a first mobile terminal and a second mobile terminal, wherein the first mobile terminal and the second mobile terminal are connected to a server, the method comprising:
at the first mobile terminal having one or more processors and memory storing programs executed by the one or more processors, while being engaged in an active communication session of a messaging network application running on the first and second mobile terminals:
detecting a movement status of the first mobile terminal;
in accordance with a determination that the movement status satisfies a predefined condition, sending a notification request that inquires a status of the second mobile terminal to the second mobile terminal through the server, wherein:
the notification request contains a second terminal identifier corresponding to the second mobile terminal, and
in response to the notification request, the second mobile terminal is configured to return a notification response to the first mobile terminal through the server;
receiving the notification response from the server; and
displaying the notification response at the first mobile terminal, wherein the notification response indicates whether the second mobile terminal is in a current communication with a third mobile terminal or is in an idle status.

2. The method of claim 1, wherein:
the predefined condition is that the first mobile terminal is being shaken.

3. The method of claim 1, further comprising:
periodically sending a first terminal communication report to the server, wherein the first terminal communication report indicates whether the first terminal is in an active communication session with the second terminal.

4. The method of claim 1, wherein:
the second mobile terminal periodically sends a second terminal communication report to the server, and
the second terminal communication report indicates whether the second mobile terminal is in a current communication with the third mobile terminal or is in an idle status.

5. The method of claim 1, wherein:
the notification request indicates that the first mobile terminal is waiting for a response from the second mobile terminal.

6. The method of claim 1, wherein:
the notification request contains a first terminal identifier corresponding to the first terminal, and
the notification response is based on the first terminal identifier.

7. The method of claim 1, wherein:
the notification request causes the second terminal to engage in preset actions.

8. The method of claim 7, wherein:
the preset actions are vibrating, flashing, displaying a message, receiving an email, displaying a pop-up window, displaying a picture or photo, playing a sound track, showing a video, or any combination thereof.

9. A computer system in conjunction with a first mobile terminal that is communicatively coupled to a server and a second mobile terminal, the computer system comprising:
one or more processors;
memory; and
one or more programs modules stored in the memory and configured for execution by the one or more processors, the one or more program modules including:
a detection module configured to, while the first mobile terminal is engaged in an active communication session of a messaging network application running on the first and second mobile terminals, detect a movement status of the first mobile terminal;
a notification request module configured to in accordance with a determination that the movement status satisfies a predefined condition, send a notification request that inquires a status of the second mobile terminal to the second mobile terminal through the server, wherein:
the notification request contains a second terminal identifier corresponding to the second mobile terminal, and
in response to the notification request, the second mobile terminal is configured to return a notification response to the first mobile terminal through the server;
a receiving module configured to receive the notification response from the server; and
a display module configured to display the notification response at the first mobile terminal, wherein the notification response indicates whether the second mobile terminal is in a current communication with a third mobile terminal or is in an idle status.

10. The computer system of claim 9, wherein:
the predefined condition is that the first mobile terminal is being shaken.

11. The computer system of claim 9, wherein the first mobile terminal further comprises:
a communication report module configured to periodically send a first terminal communication report to the server, wherein the first terminal communication report indicates whether the first terminal is in an active communication session with the second terminal.

12. The computer system of claim 9, wherein:
the second mobile terminal periodically sends a second terminal communication report to the server, and
the second terminal communication report indicates whether the second mobile terminal is in a current communication with the third mobile terminal or is in an idle status.

13. The computer system of claim 9, wherein:
the notification request indicates that the first mobile terminal is waiting for a response from the second mobile terminal.

14. The computer system of claim 9, wherein:
the notification request contains a first terminal identifier corresponding to the first terminal, and
the notification response is based on the first terminal identifier.

15. The computer system of claim 9, wherein:
the second mobile terminal comprises a processing module,
the processing module is configured to engage in preset actions upon receiving the notification request.

16. A non-transitory computer readable storage medium having stored therein one or more instructions, which, when executed by a first mobile terminal that is communicatively coupled to a server and a second mobile terminal, cause the first mobile terminal to:

while the first mobile terminal is engaged in an active communication session of a messaging network application running on the first and second mobile terminals:
  detect a movement status of the first mobile terminal;
  in accordance with a determination that the movement status satisfies a predefined condition, send a notification request that inquires a status of the second mobile terminal to the second mobile terminal through the server, wherein:
    the notification request contains a second terminal identifier corresponding to the second mobile terminal, and
    in response to the notification request, the second mobile terminal is configured to return a notification response to the first mobile terminal through the server;
  receive the notification response from the server; and
  display the notification response at the first mobile terminal, wherein the notification response indicates whether the second mobile terminal is in a current communication with a third mobile terminal or is in an idle status.

17. The non-transitory computer readable storage medium of claim 16, wherein:
  the predefined condition is that the first mobile terminal is being shaken.

18. The non-transitory computer readable storage medium of claim 16, wherein the instruction further cause the first mobile terminal to:
  periodically send a first terminal communication report to the server, wherein the first terminal communication report indicates whether the first terminal is in an active communication session with the second terminal.

19. The non-transitory computer readable storage medium of claim 16, wherein:
  the second mobile terminal periodically sends a second terminal communication report to the server, and
  the second terminal communication report indicates whether the second mobile terminal is in a current communication with the third mobile terminal or is in an idle status.

20. The non-transitory computer readable storage medium of claim 16, wherein:
  the notification request indicates that the first mobile terminal is waiting for a response from the second mobile terminal.

* * * * *